United States Patent
Sugizaki et al.

(10) Patent No.: US 6,512,872 B2
(45) Date of Patent: Jan. 28, 2003

(54) OPTICAL FIBER, DISPERSION COMPENSATOR USING OPTICAL FIBER, OPTICAL TRANSMISSION LINE USING OPTICAL FIBER, AND OPTICAL TRANSMISSION SYSTEM USING OPTICAL FIBER

(75) Inventors: Ryuichi Sugizaki, Tokyo (JP); Yoshihisa Suzuki, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/878,976

(22) Filed: Jun. 13, 2001

(65) Prior Publication Data

US 2001/0055436 A1 Dec. 27, 2001

Related U.S. Application Data

(63) Continuation of application No. PCT/JP00/09113, filed on Dec. 21, 2000.

(30) Foreign Application Priority Data

Dec. 22, 1999 (JP) .......................................... 11-364608
Sep. 21, 2000 (JP) ........................................ 2000-287472

(51) Int. Cl.⁷ ................................................ G02B 6/16
(52) U.S. Cl. ........................................................ 385/123
(58) Field of Search .......................................... 385/123

(56) References Cited

U.S. PATENT DOCUMENTS 5,673,354 A  9/1997 Akasaka et al.
6,021,245 A * 2/2000 Berger et al. .............. 359/161
6,188,823 B1 * 2/2001 Ma ............................. 385/123
6,263,138 B1 * 7/2001 Sillard et al. ............... 385/123

FOREIGN PATENT DOCUMENTS

| EP | 0 940 697 | 9/1999 |
|---|---|---|
| JP | 10-325913 | 12/1998 |
| JP | 11-84158 | 3/1999 |
| WO | WO 00/17685 | 3/2000 |
| WO | WO 00/25158 | 5/2000 |
| WO | WO 01/01178 | 6/2000 |

OTHER PUBLICATIONS

Broad Band Dispersion Slope Compensation of Dispersion Shifted Fiber Using Negative Slope Fiber, by T. Tsuda et al.; ECOC '98, Sep. 20–24, 1998, Madrid, Spain, pp. 233–234.
Novel Network Fiber to Manage Dispersion at 1.55μm with Combination of 1.3μm Zero Dispersion Single Mode Fiber, By Kazunori Mukasa et al., ECOC '97, Sep. 22–25, 1997, Conference Publication No. 448, IEE, 1997, pp. 127–130.
Dispersion Flattened Single–Mode Fiber for 10,000km Transmission System, by Yuji Kubo et al., ECOC '90, pp. 505–508.

* cited by examiner

*Primary Examiner*—Hung N. Ngo
(74) *Attorney, Agent, or Firm*—Oblon, Spivak, McClelland, Maier & Neustadt, P.C.

(57) ABSTRACT

Disclosed is an optical fiber, which comprises a core and a clad of a two-layer structure including an innermost layer and an outermost layer, and has a refractive index distribution structure satisfying the conditions of $0.8\% \leq \Delta1 \leq 1.3\%$ and $-0.7\% \leq \Delta2 \leq -0.4\%$, and also satisfying the conditions of $-20 \leq D \leq 0$, $-0.1 \leq S < 0$ and $0 \leq (D/S) \leq 200$ in a specified wavelength band having a band width of at least 20 nm in a 1.5 μm wavelength band.

8 Claims, 1 Drawing Sheet

OPTICAL FIBER, DISPERSION COMPENSATOR USING OPTICAL FIBER, OPTICAL TRANSMISSION LINE USING OPTICAL FIBER, AND OPTICAL TRANSMISSION SYSTEM USING OPTICAL FIBER

CROSS REFERENCE TO RELATED APPLICATIONS

This is a Continuation Application of PCT Application No. PCT/JP00/09113, filed Dec. 21, 2000, which was not published under PCT Article 21(2) in English.

This application is based upon and claims the benefit of priority from the prior Japanese Patent Applications No. 11-364608, filed Dec. 22, 1999; and No. 2000-287472, filed Sep. 21, 2000, the entire contents of both of which are incorporated herein by reference.

BACKGROUND OF THE INVENTION

The present invention relates to an optical fiber, particularly, to an optical transmission line suitably used in a wavelength division multiplexing (WDM) optical communications.

The WDM transmission is a system in which a signal having a plurality of wavelengths is transmitted by a single optical fiber. In recent years, an optical amplifier using an erbium-doped optical fiber (EDFA) has been developed, making it unnecessary to convert an optical signal into an electric signal for each wavelength in the relay by the WDM transmission. The advent of the EDFA accelerates the inclination toward the WDM transmission.

Large factors inhibiting the high speed transmission of optical signals include a chromatic dispersion and the nonlinear properties. If the chromatic dispersion is large, the deterioration of the waveform proceeds so as to make it impossible to perform a high speed transmission. On the other hand, if the chromatic dispersion approaches zero, the four wave mixing (FWM), which is one of the nonlinear phenomena, is generated so as to make it difficult to perform the WDM transmission.

For avoiding the phenomenon, proposed in Japanese Patent Disclosure (Kokai) No. 7-168046 is an optical fiber whose nonlinear phenomenon was suppressed so as to permit the optical fiber to bear a non-zero dispersion in the transmission band of the optical signal.

The problems of dispersion and nonlinear properties seemed to have been solved by the use of the optical fiber for the WDM transmission. If the number of optical signals used for the WDM transmission is increased to meet the demands for the large capacity transmission, it is necessary to maintain a non-zero dispersion over a wide wavelength band. However, the dispersion slope of the optical fiber for the WDM transmission makes it impossible to maintain a non-zero dispersion over a wide wavelength band.

It may be possible to realize an optical fiber having a non-zero dispersion over the entire region of the transmission band and having a dispersion slope that is substantially zero. However, the optical fiber of this type is generally poor in the nonlinear properties. If the optical fiber of this type is connected immediately after the optical amplifier, distortion is generated in the optical signal.

Further, where a large capacity transmission is performed at a high speed, it is desirable to diminish the accumulated dispersion, which is the chromatic dispersion over the entire optical transmission line, as much as possible. However, where the optical transmission line is formed of only the optical fibers for the WDM transmission, the chromatic dispersion of the optical fiber approaches zero, with the result that FWM tends to be generated.

An object of the present invention is to provide an optical fiber that permits compensating the dispersion slope of an optical transmission line using optical fibers having a non-zero dispersion in the transmission band of optical signals so as to make it possible to achieve the WDM transmission over a wide transmission band.

Another object of the present invention is to provide a dispersion compensator using the particular optical fiber.

Another object of the present invention is to provide an optical transmission line using the particular optical fiber.

Still another object of the present invention is to provide an optical transmission system using the particular optical fiber.

BRIEF SUMMARY OF THE INVENTION

According to a first aspect of the present invention, there is provided an optical fiber which comprises a core and a two-layer clad including an innermost layer and an outermost layer, and has a refractive index distribution structure satisfying the conditions of $0.8\% \leq \Delta 1 \leq 1.3\%$ and $-0.7\% \leq \Delta 2 \leq -0.4\%$, where $\Delta 1$ represents a relative refractive index difference of the core with respect to the outermost layer of the clad, and $\Delta 2$ represents a relative refractive index difference of the innermost layer of the clad with respect to the outermost layer of the clad, and also satisfying the conditions of $-20 \leq D \leq 0$, $-0.1 \leq S < 0$ and $0 \leq (D/S) \leq 200$ in specified wavelength band having a band width of at least 20 nm in a 1.5 $\mu$m wavelength band, where D represents the chromatic dispersion (ps/nm/km) at a specified wavelength in a 1.5 $\mu$m wavelength band, and S represents the dispersion slope (ps/nm²/km).

It is desirable for the optical fiber of the present invention to satisfy the conditions of $2 \leq a \leq 5$, $a \leq b \leq 15$ and $0.3 \leq (a/b) \leq 0.5$, where a represents the outer diameter of the core, and b represents the outer diameter of the innermost layer of the clad.

According to a second aspect of the present invention, there is provided a dispersion compensator comprising the optical fiber defined as above and capable of compensating an average dispersion slope (ps/sm²/km) to be not smaller than −0.01 and not larger than 0.01 in specified wavelength band having a band width of at least 20 nm in a 1.5 $\mu$m wavelength band, when the dispersion compensator is incorporated in an optical transmission line.

When the dispersion compensator is incorporated in an optical transmission line, it is desirable for the dispersion compensator to be capable of compensating an average dispersion slope (ps/nm²/km) to be not smaller than −0.03 and not larger than 0.03 in specified wavelength band having a band width of at least 40 nm in a 1.5 $\mu$m wavelength band.

According to a third embodiment of the present invention, there is provided an optical transmission line comprising the optical fiber defined as above, wherein an average dispersion slope (ps/nm²/km) in specified wavelength band having a band width of at least 20 nm in a 1.5 $\mu$m wavelength band is compensated to be not smaller than −0.01 and not larger than 0.01.

In the optical transmission line of the present invention, it is desirable for an average dispersion slope (ps/nm²/km) in specified wavelength band having a band width of at least 40 nm in a 1.5 $\mu$m wavelength band to be compensated to be not smaller than −0.03 and not larger than 0.03.

According to a fourth aspect of the present invention, there is provided an optical transmission system comprising the optical fiber defined as above, wherein an average dispersion slope (ps/nm$^2$/km) in specified wavelength band having a band width of at least 20 nm in a 1.5 μm wavelength band is compensated to be not smaller than −0.01 and not larger than 0.01.

In the optical transmission system of the present invention, it is desirable for an average dispersion slope (ps/nm$^2$/km) in specified wavelength band having a band width of at least 40 nm in a 1.5 μm wavelength band to be compensated to be not smaller than −0.03 and not larger than 0.03.

The optical transmission system according to the fourth aspect of the present invention can be realized suitably by the dispersion compensator according to the second aspect of the present invention and by the optical transmission line according to the third aspect of the present invention.

The dispersion value of the optical fiber used in the WDM transmission line is about 2 to 6 ps/nm/km, and the average dispersion slope is about +0.07 ps/nm$^2$/km. An optical transmission line capable of compensating the non-zero dispersion, decreasing the dispersion slope, and exhibiting flat dispersion characteristics over a wide wavelength range can be realized by connecting an optical fiber having a negative chromatic dispersion and a negative dispersion slope to a transmission line having a non-zero dispersion and a dispersion slope. As a result, the wavelength band that can be used can be widened, making it possible to achieve a WDM transmission over a wide wavelength band.

In each of the aspects described above, the expression "1.5 μm wavelength band" represents a band having a wavelength of 1520 to 1620 nm unless otherwise specified herein later. Likewise, the "specified wavelength in a 1.5 μm wavelength band" represents a specified wavelength such as 1550 nm. Further, the "specified wavelength band in a 1.5 μm wavelength band" falls within the band of 1520 to 1620 nm and represents a wavelength band under which the optical transmission is actually performed in the optical transmission line, e.g., the conventional 1.55 μm wavelength band (which represents the wavelength of 1530 to 1570 nm in many cases).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

Figure 1:
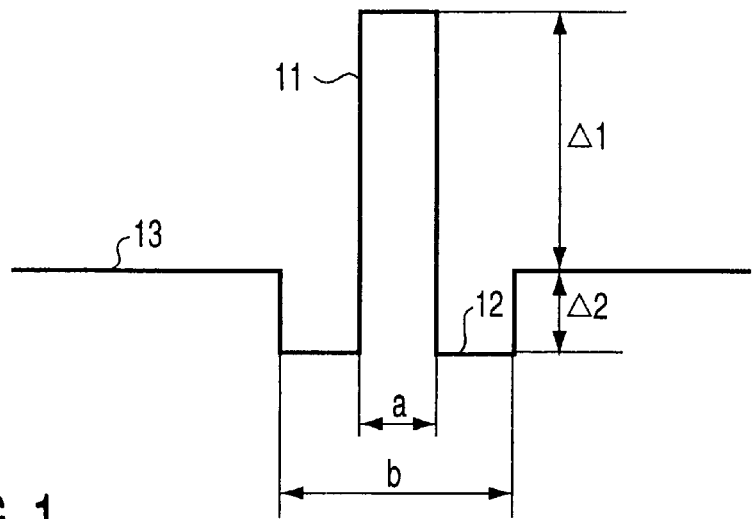
FIG. 1 is a view exemplifying the refractive index distribution structure of the optical fiber according to a first embodiment of the present invention.

FIG. 1 exemplifies the refractive index distribution of an optical fiber according to the first embodiment of the present invention. In the optical fiber exhibiting the refractive index distribution shown in FIG. 1, a clad has a two-layer structure. The refractive index distribution shown in FIG. 1 indicates the refractive index of a core 11, that of an inner clad 12, and that of an outer clad 13 in the order mentioned as viewed from the inside. The maximum difference in the relative refractive index between the core 11 and the outer clad 13 is Δ1, and the difference in the relative refractive index between the inner clad 12 and the outer clad 13 is Δ2.

Figure 2:
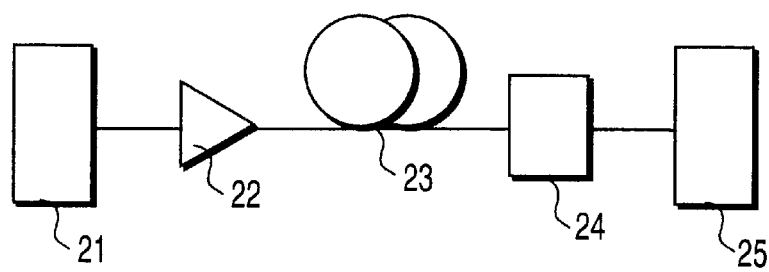
FIG. 2 is a view exemplifying an optical transmission system using a dispersion compensator according to a second embodiment of the present invention.

FIG. 2 exemplifies an optical transmission system including a dispersion compensator according to the second embodiment of the present invention and using the optical fiber of the present invention. As shown in FIG. 2, the optical transmission system comprises an optical transmitter 21, an optical amplifier 22, an optical transmission line 23 using an optical fiber for the WDM transmission, a dispersion compensator 24 using the optical fiber of the present invention, and an optical receiver 25. The system itself shown in FIG. 2 is equal to the conventional system. However, the optical fiber of the present invention is used in the dispersion compensator 24 so as to markedly improve the dispersion characteristics and to make the system shown in FIG. 2 different from the conventional system.

Figure 3:
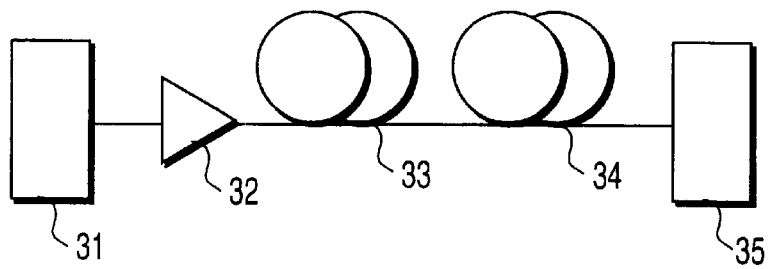
FIG. 3 is a view exemplifying an optical transmission system using an optical transmission line according to a third embodiment of the present invention.

FIG. 3 exemplifies an optical transmission system including an optical transmission line according to the third embodiment of the present invention and using the optical fiber of the present invention. As shown in FIG. 3, the optical transmission system includes an optical transmitter 31, an optical amplifier 32, a first optical transmission line 33 using an optical fiber for the WDM transmission, a second optical transmission line 34 using the optical fiber of the present invention, and an optical receiver 35. The system itself shown in FIG. 3 is equal to the conventional system. However, the optical fiber of the present invention is used in the second optical transmission line 34 so as to markedly improve the dispersion characteristics and make the optical transmission system shown in FIG. 3 different from the conventional system.

The optical fiber of the present invention is used in the optical transmission system shown in each of FIGS. 2 and 3 so as to markedly improve the dispersion characteristics of the optical transmission system, as described above. It follows that the optical transmission system itself constitutes the fourth embodiment of the present invention.

Some Examples of the present invention will now be described so as to set forth more clearly the effect of the present invention.

EXAMPLE 1

Prepared were optical fibers of the refractive index distribution structure shown in FIG. 1. Table 1 shows the parameter of the refractive index distribution and the characteristics under the wavelength of 1550 nm of the optical fiber.

TABLE 1

| Δ1 (%) | Δ2 (%) | a/b | Core diameter (μm) | Dispersion (ps/nm/km) | Dispersion slope (ps/nm²/km) | DPS (nm) |
|---|---|---|---|---|---|---|
| 1.4 | −0.7 | 0.5 | 4.45 | −20 | −0.048 | 420 |
| 1.3 | −0.6 |  | 4.48 | −35 | −0.175 | 200 |
|  | −0.7 |  | 4.65 | −19 | −0.095 | 200 |
| 1.2 | −0.4 |  | 4.10 | −87 | −0.458 | 190 |
|  | −0.5 |  | 4.50 | −41 | −0.209 | 196 |
|  | −0.6 |  | 4.75 | −22 | −0.111 | 198 |
|  | −0.7 |  | 4.85 | −16 | −0.096 | 167 |
|  | −0.8 |  | 4.95 | 3 | 0.030 | *** |
| 1.1 | −0.4 |  | 4.50 | −52 | −0.301 | 173 |
|  | −0.5 |  | 4.75 | −33 | −0.191 | 173 |
|  | −0.6 |  | 5.05 | −13 | −0.074 | 176 |
|  | −0.7 |  | 5.15 | −8 | −0.059 | 135 |
|  | −0.8 |  | 5.20 | 8 | 0.005 | *** |

TABLE 1-continued

| Δ1 (%) | Δ2 (%) | a/b | Core diameter (μm) | Dispersion (ps/nm/km) | Dispersion slope (ps/nm²/km) | DPS (nm) |
|---|---|---|---|---|---|---|
| 1.0 | −0.4 |  | 4.75 | −49 | −0.358 | 137 |
|  | −0.5 |  | 5.00 | −30 | −0.196 | 153 |
|  | −0.6 |  | 5.45 | −4 | −0.033 | 121 |
|  | −0.7 |  | 5.50 | −0.9 | −0.028 | 32 |
|  | −0.8 |  | 6.20 | 10 | −0.020 | *** |
| 0.9 | −0.4 |  | 5.25 | −23 | −0.139 | 166 |
|  | −0.5 |  | 5.75 | −1.68 | −0.017 | 99 |
|  | −0.6 |  | 5.75 | −0.46 | −0.027 | 17 |
| 0.8 | −0.5 |  | 5.90 | −4.8 | −0.034 | 142 |
|  | −0.6 |  | 6.00 | −1.2 | −0.032 | 37 |
| 0.7 | −0.5 |  | 6.10 | 2 | 0.012 | *** |
| 1.2 | −0.6 | 0.4 | 3.50 | −20 | −0.190 | 105 |
| 1.1 | −0.6 |  | 4.50 | −8 | −0.080 | 100 |
| 1.0 | −0.6 |  | 4.80 | −0.2 | −0.010 | 20 |
| 1.1 | −0.6 | 0.3 | 4.20 | −4 | −0.133 | 30 |

Table 1 shows that DPS is not diminished if Δ1 exceeds 1.3%, i.e., at 1.4%, and that a negative dispersion is unlikely to be obtained if Δ1 is smaller than 0.8%, i.e., at 0.7%. Also, the optimum value of a/b falls within a range of between 0.3 and 0.5, i.e., 0.3≦a/b≦0.5. If the ratio a/b is constant within the optimum range, the value of DPS is diminished with decrease in the value of Δ1 and, thus, it is effective for the value of Δ1 to be small.

For realizing an optical fiber having the characteristics described above, the suitable core diameter should be 4 to 6 μm. If the core diameter is smaller than the value noted above, the optical fiber ceases to have a propagating resolution. On the other hand, if the core diameter is larger than the value noted above, it is impossible to achieve a negative dispersion slope.

Table 2 shows the dispersion characteristics of the optical fiber having Δ1 of 1.1%, Δ2 of −0.6%, and a/b of 0.4, covering the case where the core diameter of the optical fiber was changed.

TABLE 2

| Wavelength (nm) | A (Core diameter 4.5 μm) | | | B (Core diameter 4.7 μm) | | |
|---|---|---|---|---|---|---|
|  | Dispersion (ps/nm/km) | Dispersion slope (pe/nm²/km) | DPS (nm) | Dispersion (ps/nm/km) | Dispersion slope (ps/nm²/km) | DPS (nm) |
| 1520 | −7.5 | −0.028 | 285 | −3.3 | 0.021 | −158 |
| 1525 | −7.6 | −0.034 | 227 | −3.3 | 0.018 | −188 |
| 1530 | −7.7 | −0.041 | 187 | −3.3 | 0.014 | −238 |
| 1535 | −7.8 | −0.050 | 158 | −3.2 | 0.010 | −337 |
| 1540 | −8.0 | −0.059 | 136 | −3.2 | 0.005 | −817 |
| 1545 | −8.1 | −0.068 | 119 | −3.2 | 0.001 | −5280 |
| 1550 | −8.3 | −0.083 | 100 | −3.2 | −0.004 | 761 |
| 1555 | −8.5 | −0.089 | 95 | −3.2 | −0.009 | 348 |
| 1560 | −8.7 | −0.101 | 87 | −3.2 | −0.014 | 224 |
| 1565 | −9.0 | −0.113 | 80 | −3.3 | −0.020 | 165 |
| 1570 | −9.3 | −0.125 | 74 | −3.3 | 0.028 | 131 |
| 1575 | −9.6 | −0.138 | 70 | −3.4 | 0.031 | 109 |
| 1580 | −10.0 | −0.152 | 66 | −3.5 | 0.037 | 94 |
| 1585 | −10.4 | −0.166 | 63 | −3.6 | 0.044 | 83 |
| 1590 | −10.8 | −0.180 | 60 | −3.7 | 0.050 | 74 |
| 1595 | −11.3 | −0.195 | 58 | −3.9 | 0.057 | 68 |
| 1600 | −11.8 | −0.210 | 56 | −4.0 | −0.063 | 63 |
| 1605 | −12.3 | −0.226 | 55 | −4.2 | −0.070 | 60 |
| 1610 | −12.9 | −0.242 | 53 | −4.4 | −0.077 | 57 |
| 1615 | −13.6 | −0.258 | 52 | −4.6 | −0.084 | 54 |
| 1620 | −14.2 | −0.275 | 52 | −4.8 | −0.092 | 52 |

It is seen that, in the refractive index distribution structure shown in Table 2, it is possible to satisfy by changing the core diameter the requirements for the dispersion value to be a negative value not smaller than −20 ps/nm/km, for the dispersion slope to be a negative value not smaller than −0.1 ps/nm²/km, and for DPS to be a positive value not larger than 200 nm under a specified wavelength band having a band width not smaller than 20 nm.

To be more specific, the requirements given above are satisfied by optical fiber A under a wavelength of 1530 to 1555 nm and by optical fiber B under a wavelength of 1565 nm to 1620 nm.

EXAMPLE 2

A dispersion compensator was prepared by using the optical fiber prepared in Example 1 in order to compensate the dispersion slope of the known optical fiber of 60 km for the WDM transmission. Optical fiber B shown in Table 2 was used for preparing the dispersion compensator. The optical transmission system was constructed as shown in FIG. 2. The optical fiber for the WDM transmission exhibited a dispersion value of +4 ps/nm/km under a wavelength of 1550 nm and a dispersion slope of 0.075 ps/nm²/km under the same wavelength.

Table 3 shows the dispersion characteristics of the transmission line connected to the dispersion compensation module having the construction shown in FIG. 2:

TABLE 3

| Wavelength (nm) | Dispersion of transmission line (ps/nm/km) | Dispersion after compensation (ps/nm/km) | Dispersion slope after compensation (ps/nm²/km) |
| --- | --- | --- | --- |
| 1520 | 1.96 | −5.00 | 0.0910 |
| 1525 | 2.30 | −4.56 | 0.0862 |
| 1530 | 2.64 | −4.14 | 0.0822 |
| 1535 | 2.98 | −3.73 | 0.0779 |
| 1540 | 3.32 | −3.30 | 0.0734 |
| 1545 | 3.66 | −3.00 | 0.0686 |
| 1550 | 4.00 | −2.67 | 0.0636 |
| 1555 | 4.34 | −2.37 | 0.0583 |
| 1560 | 4.68 | −2.09 | 0.0529 |
| 1565 | 5.02 | −1.64 | 0.0472 |
| 1570 | 5.36 | −1.02 | 0.0413 |
| 1575 | 5.70 | −1.42 | 0.0352 |
| 1580 | 6.04 | −1.26 | 0.0244 |
| 1585 | 6.38 | −1.18 | 0.0143 |
| 1590 | 6.72 | −1.12 | 0.0100 |
| 1595 | 7.06 | −1.08 | 0.0080 |
| 1600 | 7.40 | −1.04 | 0.0063 |
| 1605 | 7.74 | −1.02 | 0.0000 |
| 1610 | 8.08 | −1.04 | −0.0083 |
| 1615 | 8.42 | −1.10 | −0.0218 |
| 1620 | 8.76 | −1.26 | −0.0290 |

Table 3 shows that the average dispersion slope falls within a range of ±0.03 ps/nm²/km in a specified wavelength band having a band width of 40 nm, i.e., in a wavelength of 1580 to 1620 nm. It is also shown that the average dispersion slope falls within a range of ±0.01 ps/nm²/km in a specified wavelength band having a band width of 20 nm, i.e., in a wavelength of 1590 to 1610 nm.

As pointed out above, the optical fiber according to the first embodiment of the present invention permits the average dispersion slope of the optical transmission system to fall within a range of ±0.03 ps/nm²/km in a specified wavelength band having a band width of 40 nm if the optical fiber of the present invention is incorporated in the optical transmission line. Further, the optical fiber according to the first embodiment of the present invention permits the dispersion slope to fall within a range of ±0.01 ps/nm²/km in the specified wavelength band having a band width of 20 nm.

In other words, the flatness of the dispersion gradient as shown in Table 3 was achieved by applying the optical fiber of the present invention to the system shown in FIG. 2. The flatness of the dispersion gradient in the optical transmission line using the optical fiber of the present invention is optimum as the optical transmission line, making it possible to prepare easily an optical transmission line adapted for a large capacity transmission at a high speed.

In the second embodiment of the present invention described above, the optical fiber according to the first embodiment of the present invention was wound about, for example, a bobbin so as to prepare the dispersion compensator. On the other hand, in the third embodiment of the present invention, the optical fiber according to the first embodiment of the present invention is used as a part of the optical transmission line.

Where the optical fiber according to the first embodiment of the present invention is used as a part of the optical transmission line as in the third embodiment, e.g., where the optical fiber according to the first embodiment of the present invention is incorporated in an optical fiber cable, the optical fiber of the present invention is naturally included in the optical transmission line, with the result that the distance of actually transmitting the light in the optical transmission system is rendered shorter in the third embodiment. Therefore, the optical transmission system shown in FIG. 3 permits facilitating the decrease in the transmission loss in the optical transmission line and also permits facilitating the decrease in the dispersion value per wavelength of the optical transmission system and, thus, is effective in the case of increasing the distance of the optical transmission system. The flatness of the dispersion gradient of the optical transmission line can be made optimum for the optical transmission system in this case, too.

The technical scope of the present invention is not limited to the first to fourth embodiments described above. For example, it is possible for the clad of the optical fiber of the present invention to consist of three or more layers. Also, needless to say, the optical transmission system to which the optical fiber of the present invention is applied is not limited to those shown in FIGS. 2 and 3.

What is important is that the present invention provides an optical fiber satisfying the conditions of $-20 \leq D < 0$, $-0.1 \leq S < 0$, and $0 < (D/S) \leq 200$, where D represents the chromatic dispersion (ps/nm/km) at a specified wavelength of 1.5 μm wavelength band, and S represents the dispersion slope (ps/nm²/km), in specified wavelength band in a 1.5 μm wavelength band having a band width of at least 20 nm, as well as a dispersion compensator, an optical transmission line, and an optical transmission system each using the particular optical fiber of the present invention.

As described above, the present invention provides an optical fiber capable of compensating simultaneously both the chromatic dispersion and the dispersion slope of an optical transmission line having a non-zero dispersion in the transmission wavelength band of an optical signal and also capable of achieving a WDM transmission over a wide wavelength band.

The present invention also provides a dispersion compensator, an optical transmission line, and an optical transmission system capable of achieving a WDM transmission over a wide wavelength band.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dispersion compensating optical fiber which comprises a core and a clad including an innermost layer and an outermost layer, and has a refractive index distribution structure satisfying conditions of $0.8\% \leq \Delta 1 \leq 1.3\%$ and $-0.7\% < \Delta 2 < -0.4\%$, where $\Delta 1$ represents a relative refractive index difference of the core with respect to the outermost layer of the clad, and $\Delta 2$ represents a relative refractive index difference of the innermost layer of the clad with respect to the outermost layer of the clad, and also satisfying the conditions of $-20 \leq D \leq -8$, $-0.1 \leq S < 0$ and $0 \leq (D/S) \leq 200$ in specified wavelength band having a band width of at least 20 nm in a 1.5 μm wavelength band, where D represents the chromatic dispersion (ps/nm/km) at a specified wavelength in a 1.5 μm wavelength band, and S represents the dispersion slope (ps/nm²/km).

2. The optical fiber according to claim 1, wherein the optical fiber satisfies the conditions of $2 \leq a \leq 5$, $a \leq b \leq 15$ and $0.3 \leq (a/b) \leq 0.5$, where a represents the outer diameter (μm) of the core, and b represents the outer diameter (μm) of the innermost layer of the clad.

3. A dispersion compensator comprising the optical fiber defined in claim 1 or 2, wherein said dispersion compensator is capable of compensating an average dispersion slope (ps/sm²/km) to be not smaller than −0.01 and not larger than 0.01 in specified wavelength band having a band width of at least 20 nm in a 1.5 μm wavelength band, when the dispersion compensator is incorporated with an optical transmission line.

4. A dispersion compensator comprising the optical fiber defined in claim 1 or 2, wherein said dispersion compensator is capable of compensating an average dispersion slope (ps/sm²/km) to be not smaller than −0.03 and not larger than 0.03 in specified wavelength band having a band width of at least 40 nm in a 1.5 μm wavelength band, when the dispersion compensator is incorporated in an optical transmission line.

5. An optical transmission line comprising the optical fiber defined in claim 1 or 2, wherein an average dispersion slope (ps/nm²/km) in specified wavelength band having a band width of at least 20 nm in a 1.5 μm wavelength band is compensated to be not smaller than −0.01 and not larger than 0.01.

6. An optical transmission line comprising the optical fiber defined in claim 1 or 2, wherein an average dispersion slope (ps/nm²/km) in specified wavelength band having a band width of at least 40 nm in a 1.5 μm wavelength band is compensated to be not smaller than −0.03 and not larger than 0.03.

7. An optical transmission system comprising the optical fiber defined claim 1 or 2, wherein an average dispersion slope (ps/nm²/km) in specified wavelength band having a band width of at least 20 nm in a 1.5 μm wavelength band is compensated to be not smaller than −0.01 and not larger than 0.01.

8. An optical transmission system comprising the optical fiber defined claim 1 or 2, wherein an average dispersion slope (ps/nm²/km) in specified wavelength band having a band width of at least 40 nm in a 1.5 μm wavelength band is compensated to be not smaller than −0.03 and not larger than 0.03.

* * * * *